(12) United States Patent
Johns

(10) Patent No.: US 6,366,289 B1
(45) Date of Patent: Apr. 2, 2002

(54) METHOD AND SYSTEM FOR MANAGING A DISPLAY IMAGE IN COMPRESSED AND UNCOMPRESSED BLOCKS

(75) Inventor: Kyle Johns, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/118,444

(22) Filed: Jul. 17, 1998

(51) Int. Cl.[7] .............................................. G06F 12/02
(52) U.S. Cl. ......................... 345/543; 345/555; 345/544
(58) Field of Search ......................... 345/202, 507–509, 345/513, 515, 516, 555, 530, 545, 564, 568, 543, 544; 382/232, 233, 244–248; 711/200, 202, 203

(56) References Cited

U.S. PATENT DOCUMENTS

| | | | |
|---|---|---|---|
| 5,237,460 A | * 8/1993 | Miller et al. | 360/8 |
| 5,696,926 A | * 12/1997 | Culbert et al. | 711/203 |
| 5,696,927 A | * 12/1997 | MacDonald et al. | 711/207 |
| 5,699,539 A | * 12/1997 | Garber et al. | 711/2 |
| 5,801,717 A | 9/1998 | Engstrom et al. | 345/539 |
| 5,844,569 A | 12/1998 | Eisler et al. | 345/433 |
| 5,867,166 A | 2/1999 | Myhrvold et al. | 345/419 |
| 5,880,737 A | 3/1999 | Griffin et al. | 345/582 |
| 5,936,616 A | * 8/1999 | Torborg, Jr. et al. | 345/202 |
| 6,038,033 A | * 3/2000 | Bender et al. | 358/1.16 |

OTHER PUBLICATIONS

Mark Nelson, *The Data Compression Book,* Lossy Graphics Compression, Chap. 11, M&T Books, 1992, pp. 347–374.
William B. Pennebaker and Joan Mitchell, *JPEG Stil Image Data Compression Standard,* Image Compression Systems, Chap. 5, 6, 7, Van Nostrand Reinhold, 1993, pp. 65–134.

* cited by examiner

*Primary Examiner*—Kee M. Tung
(74) *Attorney, Agent, or Firm*—Klarquist Sparkman, LLP

(57) ABSTRACT

A virtual frame buffer controller in a computer's display system manages accesses to a display image stored in discrete compressed and uncompressed blocks distributed in physical memory. The controller maps conventional linear pixel addresses of a virtual frame buffer to pixel locations within blocks stored at arbitrary places in physical memory. The virtual frame buffer controller maintains a data structure, called a pointer list, to keep track of the physical memory location and compression state of each block of pixels in the virtual frame buffer. The virtual frame buffer controller initiates a decompression process to decompress a block when a pixel request maps to a pixel in a compressed block. The block remains decompressed until physical memory needs to be reclaimed to free up memory. A software driver for the virtual frame buffer controller performs memory management functions, including adding to a free memory list when the virtual frame buffer requires more memory and reclaiming memory previously allocated to a block of pixels whose state has changed from a compressed to an uncompressed state, or from a decompressed back to a compressed state.

21 Claims, 8 Drawing Sheets

FIG. 7

METHOD AND SYSTEM FOR MANAGING A DISPLAY IMAGE IN COMPRESSED AND UNCOMPRESSED BLOCKS

FIELD OF THE INVENTION

The invention relates to display memory management in a computer.

BACKGROUND OF THE INVENTION

There is a growing trend in the computer industry to make the graphical interface of a computer more compelling and realistic. Increasingly, applications for desktop computers involve more sophisticated 2D and 3D graphics and video. With the increase in computing power and improvements in multitasking operating systems, it is becoming more common for computers to concurrently execute multiple programs with user interfaces employing sophisticated graphics and video.

The images used to create sophisticated displays can require a great deal of memory and memory bandwidth. This requires the computer system to have more memory for storing, constructing and displaying images. In addition, the system must have enough memory bandwidth to allow read and write operations to update images and to construct the display image.

Computer systems such as a typical desktop personal computer (PC) or workstation generally use a frame buffer to store image data for each picture element on a display monitor such as a cathode ray tube (CRT) or Liquid Crystal Display (LCD). Each picture element on the monitor's screen has a corresponding instance of image data commonly referred to as a "pixel." To convert the image data into an image visible on the screen, a display controller periodically reads the pixels in the frame buffer (usually around 60–75 times per second) and converts them into signals used to energize the picture elements on the screen.

To change the display image, the host processor of the computer modifies the pixels in the frame buffer. For instance, in conventional PC architectures, the computer issues read and write requests to a linear address space assigned to the frame buffer to read pixels and write new pixels into the frame buffer. In most computers, the operating system includes a software interface to the display hardware. Software executing in the computer can invoke functions in this interface to modify the display image. The software interface, in turn, communicates with the display hardware. For example, a program may invoke a bit block transfer function in the software interface to copy a new block of pixels to the frame buffer. The software interface translates this request into write requests to modify the contents of the frame buffer.

Some techniques have been developed to reduce the memory and memory bandwidth problems associated with frame buffer display architectures. One common way to support color displays with less memory is to use a color table or palette. A color table is an array of colors, where each color is typically represented by a Red, Green and Blue component. Each of these components is customarily represented by an 8 bit number. Rather than storing 24 bits for each pixel, each pixel represents an index into the color table. The display controller looks up the color value for each pixel as it generates the display's control signals. The color table, therefore, allows the computer to support a reasonable variety of colors while reducing the amount of memory to implement a frame buffer.

The color table approach reduces memory requirements, but is inherently limited because the table only provides a limited number of colors to choose from. An 8 bit index can only support 256 colors. While reducing the number of bits per pixel saves memory, it tends to decrease image quality.

Higher resolution workstations are capable of displaying from 1 to 2 million pixels for 24 bit per pixel (bpp) formats. These systems can achieve higher fidelity images because each pixel has 8 bits each for RGB components. These systems are expensive, however, because they typically use a frame buffer with enough memory to store a high resolution display image in 24 bpp format.

The use of a conventional frame buffer to store data for each picture element on the display screen is a major limitation of existing systems because it requires a great deal of memory. One solution is to use a different architecture that does not require a conventional frame buffer. However, it is difficult to change architectures because most of the operating systems and graphics support software is designed to interface with a conventional frame buffer that has a linear address space. New architectures can render current operating system and graphic support software obsolete.

An alternative display architecture supporting linear addressing to a compressed display image is described in co-pending U.S. patent application Ser. No. 08/695,163 filed Aug. 7, 1996, issued as U.S. Pat. No. 5,936,616, entitled "Method and System for Accessing and Displaying A Compressed Display Image In A Computer System," which is hereby incorporated by reference. In addition to maintaining a display image in a compressed format, this architecture also allows applications to build display images by overlaying multiple image layers. A related application describing image layering in detail is co-pending U.S. patent application Ser. No. 08/671,412, filed Jun. 27, 1996, issued as U.S. Pat. No. 5,867,160, entitled "Method and System for Generating Images Using Gsprites," which is hereby incorporated by reference.

For interactive graphics applications, it is usually disadvantageous to store a display image in a compressed format because the process of decompressing the image makes it more time consuming to access and modify the image before displaying it. For example, if a group of pixels needs to be updated to change the display image, the pixels need to be fetched from memory, decompressed and then modified. This process adds additional latency to the display process. Techniques for hiding this latency are described in co-pending U.S. patent application Ser. No. 08/670,553, filed Jun. 27, 1996, issued as U.S. Pat. No. 5,880,787, entitled "Method and System For Accessing Texture Data In Environments With High Latency In A Graphics Rendering System," which is hereby incorporated by reference.

SUMMARY OF THE INVENTION

The invention provides a display controller and method for managing memory accesses to images stored in partially compressed form. The invention may be used to manage a display image, used to refresh the display screen, as well as other "off-screen" images that may or may not be visible on the screen. Examples of off-screen images include source bitmaps that are copied to the display image (e.g., copied in bit block transfer operations), texture maps, and sprites or overlay images that are composited to form the display image. In contrast to a conventional frame buffer, the display image is stored in randomly accessible blocks of pixels in memory. A virtual frame buffer controller maps requests for pixels in a frame buffer address format to addresses of pixels in blocks scattered randomly in physical memory. To improve performance, the controller leaves blocks in an uncompressed format until it is necessary to free up memory. The system compresses least recently used blocks when necessary to free up memory for other decompressed blocks.

One aspect of the invention is a method for managing pixel accesses to uncompressed and compressed blocks of the display image. The method maps the pixel address of a read or write request to a memory location within a block of pixels located at an arbitrary place in physical memory. The block of pixels is either in a compressed or uncompressed format. A data structure in the form of a list of pixel blocks keeps track of the physical memory location of each block in the display image, and whether the block is compressed or uncompressed. When a pixel access request maps to an uncompressed block, the method computes the address of the pixel in the block and allows the operation to proceed. When a pixel access request maps to a compressed block, the method initiates a decompression process for the block, allocates memory for the block and updates the data structure to reflect that the block is uncompressed.

The method summarized above is implemented in a display controller for a computer system. A virtual frame buffer controller in the display controller is responsible for mapping addresses from a linear address space to addresses within the randomly placed blocks in physical memory. The controller maintains each block in the display image in physical memory, in either a compressed or uncompressed form, but not both. The virtual frame buffer controller operates in conjunction with a memory manager to maintain frequently used blocks in uncompressed form until additional memory needs to be freed for other consumers of the memory.

Another aspect of the invention is the method for managing memory used to implement the virtual frame buffer. Memory management functions are implemented in driver software executing on the display controller's host computer system. The driver provides more memory for the virtual frame buffer when necessary to store additional uncompressed blocks. It also allocates memory for blocks that are recompressed. In addition to allocating memory, the driver reclaims memory previously allocated to compressed and uncompressed blocks when these blocks are decompressed and re-compressed, respectively.

Further advantages and features of the invention will become apparent in the following detailed description and accompanying drawings.

BRIEF DESCRIPTION OF THE DRAWINGS

FIG. 7 is a diagram illustrating an example of an image chunk format and corresponding addressing scheme.

DETAILED DESCRIPTION

Brief Overview of a Computer System

Figure 1:
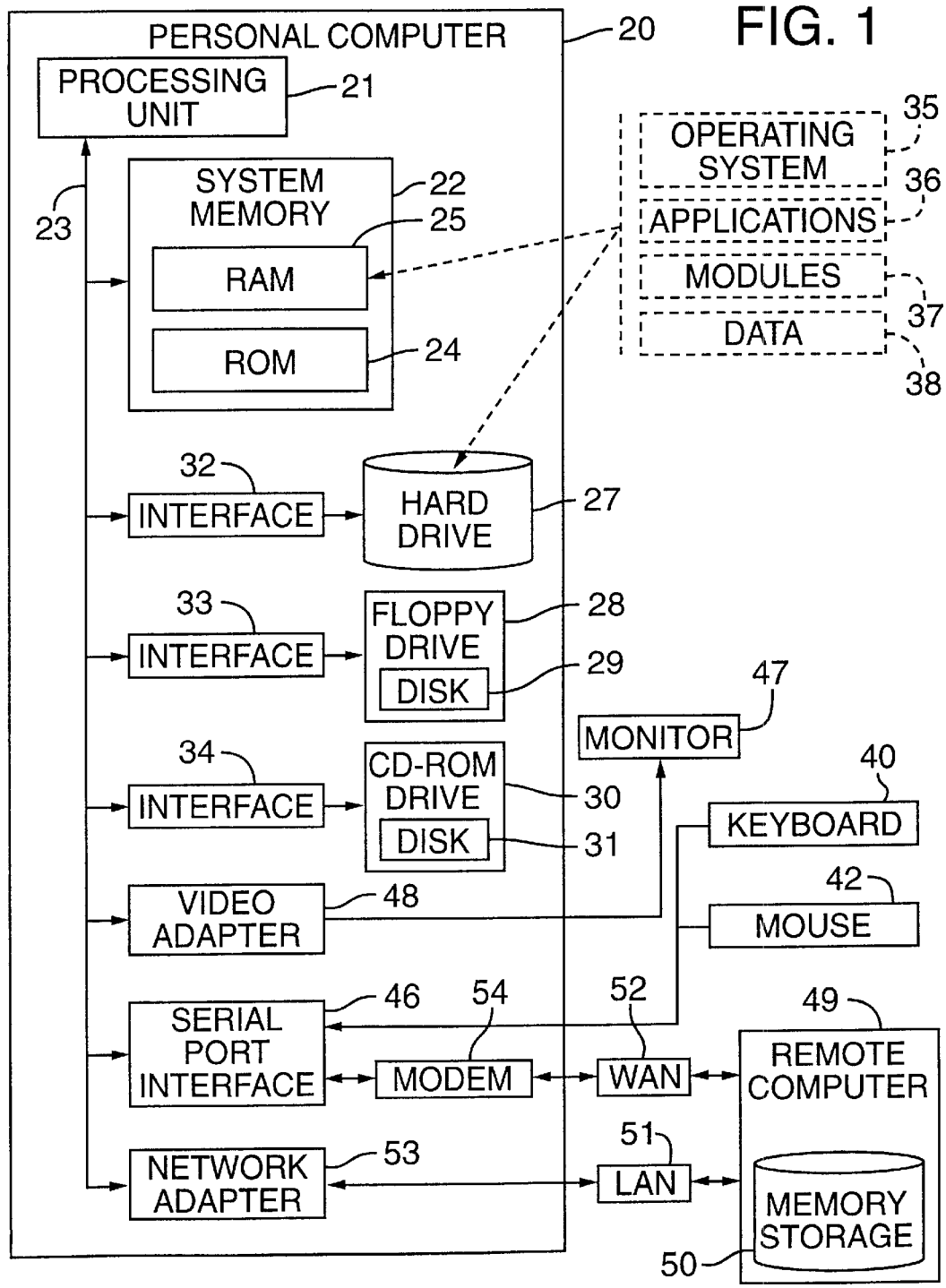
FIG. 1 is a block diagram of a computer system that serves as an operating environment for an implementation of the invention.

FIG. 1 and the following discussion are intended to provide a brief, general description of a suitable computing environment in which the invention may be implemented. An implementation of the invention, including both software and hardware components, is described in detail below. Since the implementation is designed as part of the display architecture of a computer, the following overview of the computing environment provides a background for the implementation.

The invention may be implemented in other computer system configurations, including hand-held devices, multi-processor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 1 illustrates an example of a computer system that serves as an operating environment for the invention. The computer system includes a personal computer 20, including a processing unit 21, a system memory 22, and a system bus 23 that interconnects various system components including the system memory to the processing unit 21. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions (program code such as dynamic link libraries, and executable files), etc. for the personal computer 20. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a display controller or video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 3. The logical connections depicted in FIG. 3 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. The network connections shown are merely examples and other means of establishing a communications link between the computers may be used.

Managing Compressed and Uncompressed Image Blocks

The invention provides a method for managing display memory where a visible display image as well as other images are partially compressed and partially uncompressed. Portions of each image that are accessed frequently are maintained in an uncompressed state while less frequently accessed portions are stored in a compressed state. To enable portions of an image to reside in different formats, the display architecture sub-divides the image into pixel blocks. Depending on the implementation, the pixel block can be in a variety of shapes and sizes. As a practical matter, the pixel blocks are most likely to be implemented as rectangular arrays of pixels or a horizontal row of pixels, such as a scan line.

The method for managing compressed and uncompressed pixel memory is implemented in a display architecture that manages images in two-dimensional image subregions called chunks. In the current implementation, the size of a chunk is 32 by 32 pixels. Managing image blocks in rectangular shapes has advantages in most graphics systems because pixels are typically accessed in small 2D regions. In these circumstances, a rectangular block shape provides better locality of reference as compared to a horizontal scan line.

The amount of the memory consumed by a chunk varies depending on its compression format and the format of the pixels within the chunk (the pixel format). With respect to the compression format, the chunk may be uncompressed, or may be compressed using a lossless or lossy compression method. The amount of memory consumed by a decompressed chunk varies in implementations that support a variety of pixel formats, such as 8 bpp, 16 bpp and 32 bpp formats. Another attribute of a chunk that affects the amount of data needed to store it is the control structure that stores information about the chunk. The current implementation, for example, uses a data structure called a chunk control block that stores pertinent information about a chunk such as the format of pixels within the chunk, its compression format, and the memory location of the chunk's pixels in physical memory.

The virtual frame buffer architecture is implemented in a combination of hardware and software. The software includes a driver, executing on the host CPU, which enables other system software and application programs to communicate with the graphics hardware installed in the computer. The hardware relevant to the virtual frame buffer includes a virtual frame buffer controller for managing accesses to compressed and uncompressed blocks, a decompressor for fetching and decompressing compress chunks, and one or more memory devices for storing compressed and uncompressed chunks. The virtual frame buffer architecture also includes a compressor for re-compressing decompressed chunks.

Figure 2:
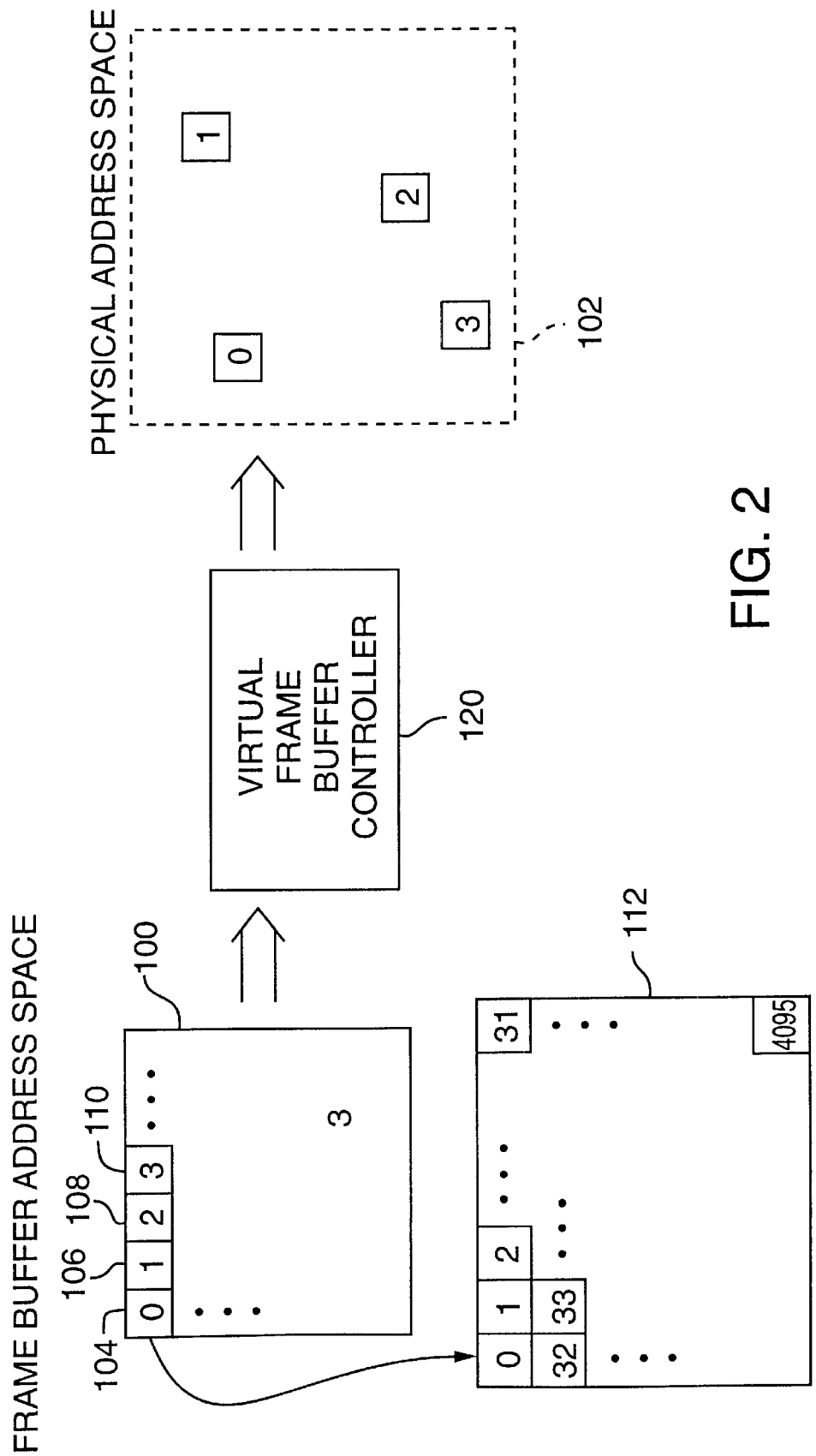
FIG. 2 is a diagram illustrating the relationship between image blocks of a display image in a frame buffer address space and the memory locations of the image blocks in physical memory.

To illustrate the concept of a virtual frame buffer, FIG. 2 shows the relationship between a conceptual two-dimensional display image (the virtual frame buffer) and a physical address space, where the discrete chunks of the display image are distributed randomly. Most conventional display controllers installed in computers refresh the display screen with a display image stored in a frame buffer. The conventional frame buffer is typically implemented in video memory that is accessed by a host CPU to read and write pixels and by the display controller or video adapter to scan the pixels out to the display screen. Conceptually, the display image is a two dimensional array of pixels corresponding to the two dimensional array of picture elements on the screen. In practice, conventional frame buffer architectures often store the image in a linear address space, where the horizontal rows of pixels are chained together in a linear array.

In FIG. 2, the frame buffer address space shows a conceptual view of a display image 100. In a typical frame buffer, the base address of the display image starts at a reference point such as the upper left hand corner of the image and counts up from left to right. At the end of each row of pixels, the next linear address continues with the first pixel in the next row. In the implementation of the virtual frame buffer, the display image used to refresh the screen is comprised of 32 by 32 pixel chunks. The term "virtual" refers to the view that the virtual frame buffer provides to application and system software running on the host CPU. To the host, the display image appears to reside in a linear address space. Thus, the display image being managed as the virtual frame buffer appears as if it resides in the frame buffer address space in FIG. 2. In actuality, the display image is sub-divided into chunks distributed randomly in memory. The frame buffer address space shown in FIG. 2 is not limited to merely storing the display image used to refresh the screen. Additional off-screen images may fit in this address space as well.

FIG. 2 shows how the pixels of a display image in frame buffer address space are partitioned into chunks. In the frame buffer address space, the chunks are arranged in contiguous rows that sub-divide the display image (e.g., 104-110). Each chunk consists of a 32 by 32 block of pixels, as shown in the expanded version of chunk 0 (112).

In physical address space, each of the chunks is stored as a discrete block of memory distributed randomly in one or more memory devices. For example, FIG. 2 shows chunks 0, 1, 2, and 3 distributed in memory. These chunks may be in uncompressed or compressed format. The virtual frame buffer controller 120 maps a linear pixel address to a memory location within an uncompressed chunk in physical memory. In order to perform this mapping, the virtual frame buffer controller maintains a data structure indicating the physical location of each chunk and whether or not the chunk is compressed. The virtual frame buffer controller also works in conjunction with a software driver to allocate memory for decompressed chunks and to reclaim memory previously allocated to a compressed chunk, once it is decompressed.

Figure 3:
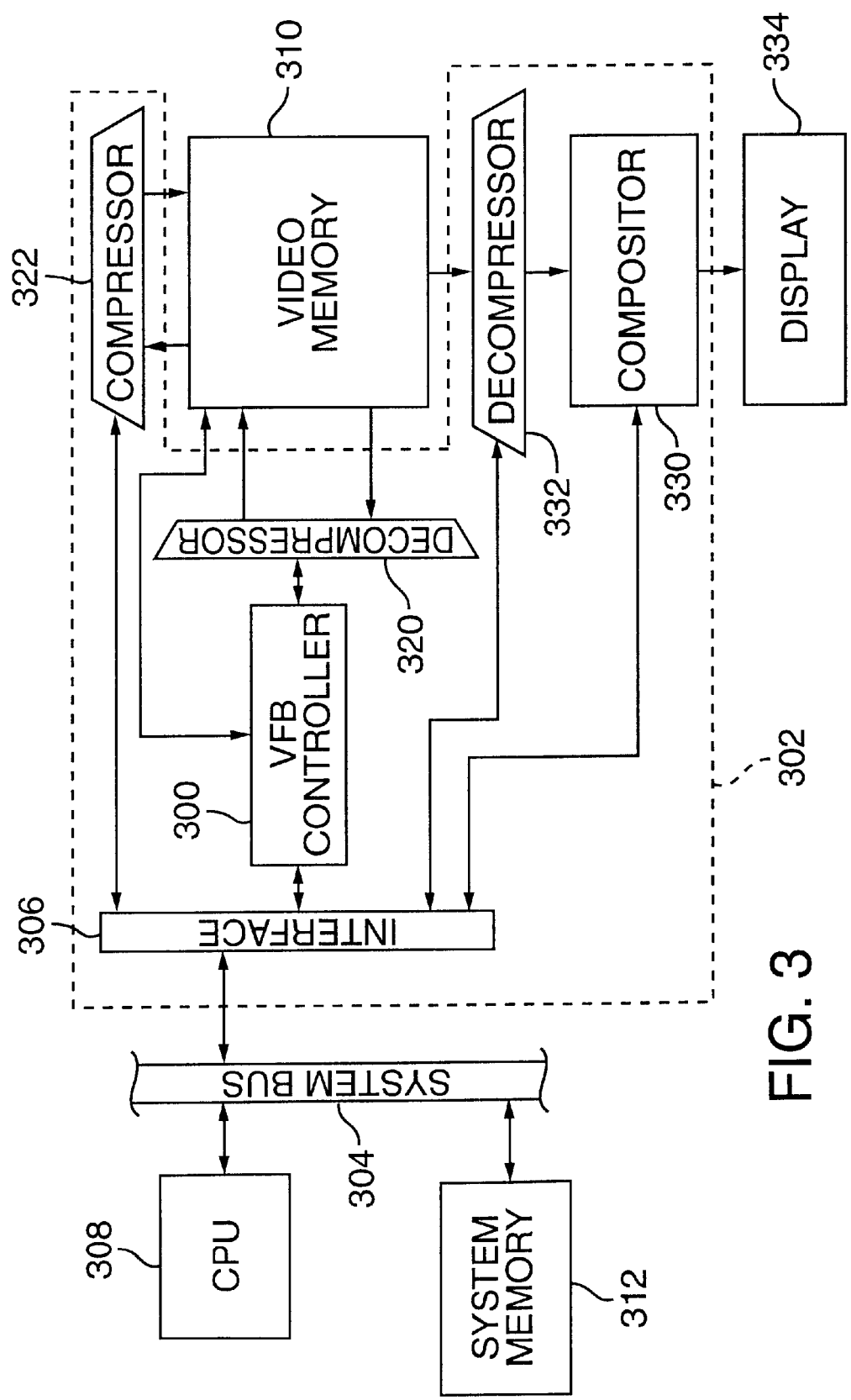
FIG. 3 is a block diagram illustrating a display architecture that implements a virtual frame buffer.

FIG. 3 is a block diagram illustrating an implementation of the virtual frame buffer in a computer system. The primary functions needed to support addressing of the virtual frame buffer are carried out in a virtual frame buffer (VFB) controller 300. In the implementation shown in FIG. 3, the VFB controller 300 is part of a display controller 302 that interfaces with the system bus 304 of the computer. The display controller shown in FIG. 3 is specifically implemented to interface with a PCI bus, but may also be implemented for other computer bus architectures. The display controller is implemented on a VLSI chip, although it is possible to implement it on more than one chip or with discrete components.

The display controller 302 communicates with the host computer and other devices connected to the system bus 304 via a bus interface 306. The VFB controller receives read and write request from the host computer's CPU 308 and possibly other clients via the system bus. Examples of clients of the VFB controller include the PCI bus itself, a 2D accelerator, and a Video Input Port (VIP). The VIP is a hardware interface on the display controller that is used to send video data directly from a camera or other video device directly into video memory for display or compositing. The device writing the video data into the VIP expects to access memory as if it were organized like a standard frame buffer, so it relies on the VFB controller to provide this view of video memory.

In addition to responding to different clients, the VFB controller can also manage requests to different memory devices including one or more local video memory devices (e.g., 310) and system memory 312. When adapted for direct memory accesses by a graphics device, the system memory is sometimes referred to as Advanced Graphics Processing (AGP) memory.

The VFB controller 300 receives requests for pixels in uncompressed and compressed chunks. To access uncompressed chunks, the VFB controller computes the address of the uncompressed pixel and communicates with the memory device containing the pixel to perform the requested operation. In most cases, the uncompressed pixel will reside in local video memory, but it may also be in system memory or some other memory device. To access compressed chunks, the VFB controller computes the address of the compressed block control data associated with the chunk and reads this control data from the memory device where it resides. The VFB controller then communicates with a decompressor 320 to tell it which chunk to decompress and where to store the uncompressed chunk. After the chunk is decompressed, the VFB controller allows the read or write operation to proceed.

When the VFB controller begins to approach its limit of free memory for uncompressed chunks, the display controller 302 ultimately may have to re-compress some uncompressed chunks to free up memory. In the implementation shown in FIG. 3, the display controller manages the compression of uncompressed blocks in conjunction with driver software executing on the host CPU and stored in system memory. The VFB controller indicates to the host when free memory is running low. The host, in turn, interacts with the display controller to re-compress least recently used chunks. To compress a chunk of pixels, the display controller includes a compressor 322 that responds to instructions from the host to retrieve and compress the chunk. Note that the VFB controller does not have to get directly involved in compressing uncompressed blocks. Instead, it simply indicates when it needs more memory to allocate to uncompressed chunks, and the host implements a memory management scheme. As an alternative, the VFB controller could implement a memory management scheme internally to reclaim memory. Thus, it is a matter of design choice to partition functions of the VFB controller between software on the host and peripherals of the host.

The display controller also manages the process of refreshing the display screen from the primary display image managed by the VFB controller and possibly other images. In particular, a compositor 330 retrieves the chunks that make up the display image from memory (e.g., the local video memory 310) and temporarily holds them in a compositing buffer. For compressed chunks, the compositor instructs a decompressor 332 to decompress the chunk and place it in the compositing buffer. The compositor uses a double buffering scheme to scan one set of output pixels to the display 334 from one buffer, while constructing another set of output pixels in another.

In one implementation, the compositor constructs the display image by compositing depth sorted image layers called sprites. Each sprite is defined as an array of chunks. The host processor computes the sprite or sprites that comprise the display image and provides a display list of sprites to the compositor. The compositor determines which chunks to fetch and decompress by looking up the chunks for each sprite in the display list from the array of chunks associated with the sprite.

In its simplest form, the display image can be constructed from a single, screen-sized sprite. The actual implementation is much more flexible in that it allows a display image to be constructed at refresh rates of 60–75 Hz from more than one depth layer of sprites. Each of these sprites may be at a variable screen location and have a variable size. Some pixel formats support an alpha channel (sometimes referred to as opacity, translucency, or transparency), which indicates the extent to which a each pixel in an image layer allows the pixel of the layer or layers behind it to be visible. With this alpha value per pixel, the compositor can compute the display image in front-to-back or back-to-front order using conventional image compositing logic. It is also possible to composite images without an alpha value by using a painter's algorithm in which images are drawn in back to front order, with occluding images overwriting all or a portion of occluded layers.

One possible implementation of the compositing logic and buffers used to implement the compositing functions above is described in U.S. patent application Ser. No.

08/671,412, U.S. Patent issued as U.S. Pat. No. 5,867,166 which is incorporated by reference above. This particular implementation employs a separate chip, called the gsprite engine, which is responsible for reading a display list of depth sorted sprites and constructing a display image from chunks, one 32 scanline band at a time. In this approach, the display list provides the sprites that impinge upon each scanline band. The compositor then fetches the chunks, decompresses them, and writes them to a double-buffered compositing buffer that implements the compositing logic to combine layers and accumulate a pixel value for each screen pixel location in the current scanline. The sprite compositor implements a separate decompressor for decompressed chunks for display, as opposed to using the same decompressor for VUB and display refresh functions.

An alternative implementation of the compositor uses a 3D graphics rendering pipeline that supports texture mapping operations to perform the compositing operations. In particular, it uses rendering hardware, similar to that described in U.S. patent application Ser. No. 08/671,412 to composite sprite layers as if they were texture maps being mapped to the surface of a polygon. In this approach, each sprite maps to a variable sized screen parallelogram at a specified, yet variable location on the screen. This parallelogram is treated as a polygon and the incoming sprite layer is treated as a texture when the rendering hardware maps the incoming sprite layer to the screen to simulate the compositing of depth-sorted, translucent image layers.

Note that it is possible to implement the controller of FIG. 3 with only one decompressor. FIG. 3 conceptually illustrates a first decompressor to decompress chunks for the VFB controller (client 1) and a second decompressor to decompress chunks for the compositor (client 2). These decompression functions may be performed in a single decompressor that serves both clients. In the implementation described in the previous paragraph, for example, the decompressor used to fetch and decompress chunks for the 3D rendering pipeline can be interrupted to process a request to decompress a chunk from the VFB controller. In this case, most of the decompressor's resources are occupied decompressing textures for texture mapping operations, including sprite compositing functions. A small portion of the decompressor's time is spent decompressing chunks in response to VFB requests.

In addition to the compositing logic and buffers needed to support sprite layers, the compositor also includes a color look up table to convert pixel values as necessary and a Digital to Analog converter (DAC) to convert digital intensity values to analog values compatible with the display device.

Figure 4:
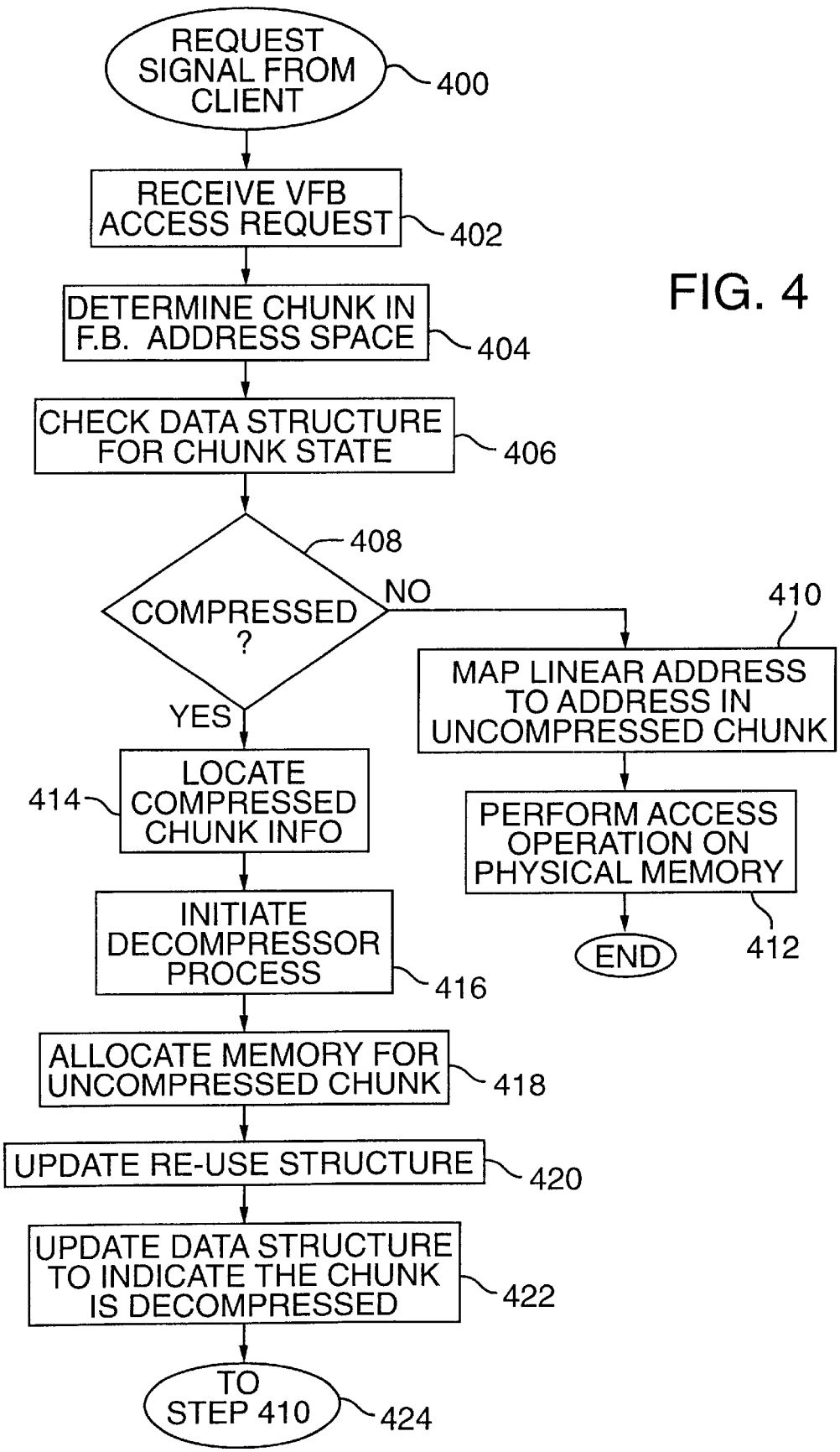
FIG. 4 is a flow diagram illustrating how the display controller in FIG. 3 processes pixel read and write requests to the virtual frame buffer.

FIG. 4 is a flow diagram illustrating the operation of the VFB controller in response to a virtual frame buffer access request. The processing of a memory request for a pixel in the virtual frame buffer begins with a signal representing a pixel read or write request from a client (400). As explained further below, the format of this signal varies depending on the pixel format. In the PCI bus implementation shown in FIG. 3, the incoming address is in a PCI bus format, which includes a linear address for a pixel in the frame buffer address space (see FIG. 2).

The display controller 302 routes the VFB access request to the VFB controller. When the VFB controller receives the request (402), it determines which chunk the request maps to in frame buffer address space (404). The VFB controller also locates the entry corresponding to this chunk in a data structure used to store the location and state of each chunk in the virtual frame buffer. In the controller shown in FIG. 3, this step also includes determining whether the access is intended for local video memory or system memory (e.g., AGP memory).

Figure 5:
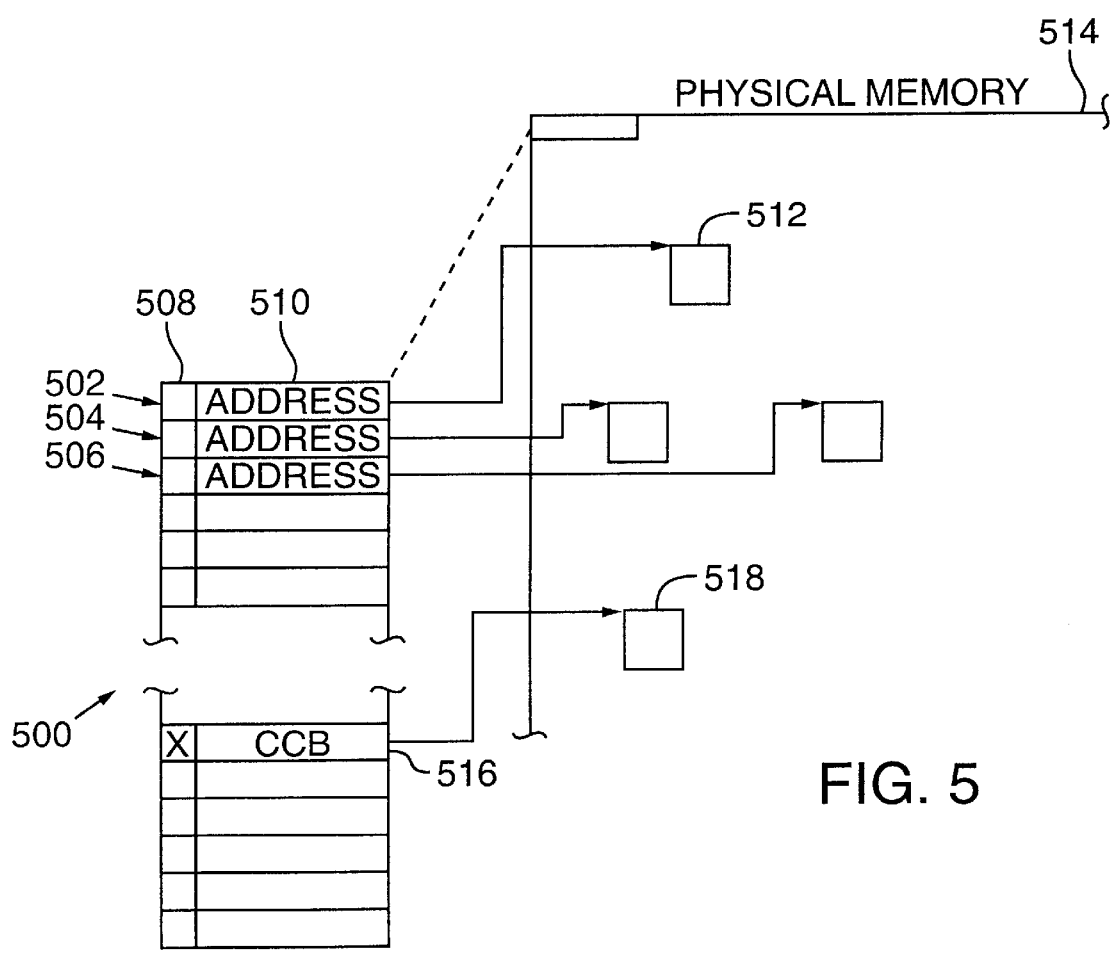
FIG. 5 is a diagram illustrating an example of a data structure called a pointer list that the virtual frame buffer controller uses to maintain the compression state and location of chunks of an image in the virtual frame buffer.

FIG. 5 illustrates an implementation of the data structure 500 that the VFB controller maintains to store the locations and state of chunks in the virtual frame buffer. The data structure 500 is a list of chunks in the virtual frame buffer. Each entry in the list (e.g., 502–506) includes a flag (508) indicating whether or not the chunk is compressed. In addition, each entry includes an address (510) of the chunk (512) in physical memory (514). In the case of an uncompressed chunk, this address is a pointer to the memory location of the uncompressed chunk. In the case of a compressed chunk, the address (516) is a pointer to a chunk control data structure, called a chunk control block (CCB) (518), that stores information about a compressed chunk. The data structure shown in FIG. 5 is referred to as a pointer list or pointer table because it stores pointers to the memory locations of chunks in physical memory. Further implementation details of the pointer list are discussed below.

Once the VFB controller has identified the chunk from the linear address, it looks up the corresponding entry in the pointer list to determine whether the chunk is compressed and to find its address in physical memory (see step 406 in FIG. 4). If the chunk is uncompressed, the VFB controller reads the base address of the chunk from the pointer list and calculates the pixel offset in the chunk based on the incoming linear address. In making this calculation, the VFB converts the incoming address from a scanline order address to a block order address (410). After computing the address of the pixel within an uncompressed chunk, the VFB performs the requested read or write operation on the pixel's address in physical memory (412).

If the chunk is compressed, the VFB locates the control information for the compressed chunk. The entry in the pointer list corresponding to the compressed chunk includes the address of the CCB that contains this information. The VFB controller initiates the decompression process (416) by providing the address of the CCB to the decompressor (320, FIG. 3). In response to receiving the CCB address, the decompressor fetches the CCB and begins to decompress the chunk.

The VFB manages the allocation of memory to store the decompressed chunk (418). When it initiates the decompression process, the VFB controller proceeds to allocate a block of physical memory to hold the decompressed chunk. In general, the VFB controller can be implemented to select the size of the memory block based on the pixel format, or it can be implemented to allocate a fixed memory block size. Since the VFB controller supports different bit per pixel formats, the size of the uncompressed chunk varies based on the pixel format. Thus, one possible implementation is to check the bit per pixel format and allocate an amount of memory corresponding to the uncompressed chunk size. An alternative approach is to allocate a fixed memory size. This fixed memory size might contain one or more chunks depending on the bit per pixel format.

In the implementation shown in FIG. 3, the VFB controller allocates free memory sections of a fixed size from a free memory section list. Each memory section comprises a contiguous set of physical memory addresses. This free memory section list is a local list maintained by the VFB controller, but is updated by the driver software executing on the host CPU. When the number of free memory sections in the local list drops below a threshold, the VFB controller notifies the driver via an interrupt. The driver then adds more free sections to the local list from its own free memory section list, if they are available. The free memory section lists are implemented as a linked list of pointers to the first word in each memory section.

As explained further below, the driver performs memory management functions that control which sections are added to the free list, and which memory sections are reclaimed for re-use. The memory management scheme reclaims physical memory in two cases: 1) it reclaims physical memory previously allocated to a compressed chunk after it is decompressed; and 2) it reclaims physical memory previously allocated to a decompressed chunk after it is re-compressed.

After initiating the decompression process and allocating memory for the uncompressed chunk, the VFB controller updates data structures associated with its memory management functions. As shown in FIG. 4, the VFB controller updates a re-use data structure, which is used to identify memory allocated to compressed chunks that can be re-used (420). This structure is implemented as a list of CCBs in physical memory. While in some implementations it is possible to implement this list as a list of pointers to memory locations storing the CCB data, the current implementation actually stores a copy of the entire CCB in the list. The implementation stores the entire CCB because the VFB controller updates the CCB once the chunk is decompressed, and other consumers of the chunk (such as the compositor) rely on the CCB to maintain the address and format of the corresponding chunk. If the VFB controller only stored a pointer to the CCB in the reuse list, then the address and format of the original compressed chunk would be lost.

The VFB controller adds new entries to the re-use list each time a chunk is decompressed. When the list reaches a threshold size, the VFB controller generates an interrupt to the host CPU. The driver software reads the CCBs, and determines which memory to add to a separate free list used for allocating memory to compressed chunks (this list is called the Memory Allocation Unit (MAU) list).

The VFB controller allocates memory to store the re-use list in memory from the free section list. The VFB constructs the re-use list by linking memory sections together such that the first word of each memory section points to the first word in another section. When the controller is initialized, the driver gives it a pointer to an empty memory section to fill with reuse information. When a memory section is full, the VFB controller generates an interrupt to the host CPU. The driver software determines which memory to add to the MAU list and also returns the filled memory section to the free memory section list.

In addition to updating the re-use list, the VFB controller also updates the pointer list to reflect that the chunk has been decompressed and stored in memory as shown in FIG. 4 (422). The VFB controller updates the flag in the corresponding entry in the list to indicate that the chunk is uncompressed and also writes the address of the uncompressed chunk at this entry. The VFB controller also updates the CCB associated with this chunk so that subsequent operations on the image will use the decompressed chunk rather than the compressed chunk. As noted above, each image or "sprite" that the VFB controller manages is defined in terms of an array of CCBs. When the compositor or some other consumer of the image accesses a chunk via its CCB, the CCB needs to accurately represent the chunk's current state. This is significant in the implementation since it only maintains and allows access to a chunk in either compressed or uncompressed form, but not both.

Now that the chunk is decompressed, the VFB controller can allow the read or write operation to occur on the pixel in the uncompressed chunk. When the VFB controller allows the VFB request to occur (424; FIG. 4), the VFB controller proceeds as shown in steps 410 and 412 of FIG. 4. In the current implementation for a PCI bus, the VFB controller takes advantage of the ability of the PCI bus controller to retry a transaction issued on the bus until the target of the transaction processes it. In particular, the PCI bus controller allows a device to specify a retry cycle when an access cannot be immediately completed. In the implementation, the VFB controller instructs the PCI bus to retry the transaction when it determines that the pixel being requested is in a compressed chunk at step 408. The VFB controller then proceeds according to steps 414–422 to decompress the chunk and update the appropriate data structures. When a successful retry occurs on the bus, the VFB controller proceeds according to steps 402 to 412. In implementations that cannot rely on the bus to retry a request, the VFB controller can use an alternative approach, such as processing the request immediately after the decompressed chunk is available without another retry, or asking the driver to retry at a later time.

There are number of possible variations and optimizations of the virtual frame buffer design described above. As illustrated in FIG. 5, the VFB controller maintains the pointer list in local video memory. While it is possible to implement memory for the pointer list on the VFB controller, it is less expensive to use an external memory device, such as local video memory to store the list. If the system has additional memory devices, the pointer list for chunks stored in the additional memory devices are stored in those devices. For example, the pointer list for chunks in AGP memory is stored in AGP memory.

By storing the pointer list on external memory rather than on chip, the VFB controller adds some memory latency in connection with reading and writing entries in the list. In one optimization, the pointer list is implemented as two lists: a list of compressed chunks, and a list of uncompressed chunks. The VFB controller implements a caching scheme to cache a portion of the most recently used part of the uncompressed pointer list on the chip. This avoids the latency that would otherwise be incurred in reading and writing pixels from uncompressed chunks. Since a compressed chunk needs to be decompressed before a read or write can be allowed, there is little advantage to implementing a caching scheme for the compressed pointer list. The compressed pointer list is stored in external memory and comprises a list of pointers to CCBs in the virtual frame buffer.

The VFB controller calculates the address of an entry in the uncompressed pointer list from the chunk number that it derives from the incoming PCI linear pixel address. The VFB controller then uses this address of the pointer list entry as a cache key. If the pointer is not resident in the cache, the VFB controller retrieves a block of pointers (including the desired pointer) from memory and updates the cache. The VFB then retrieves the desired pointer from the cache and uses it to access the pixel in the uncompressed chunk.

In the specific implementation of the two pointer lists, each list has an entry for each memory section associated with the chunks in frame buffer address space. Each entry in the uncompressed pointer list includes a flag indicating whether a corresponding chunk is compressed or uncompressed, another flag indicating the bit per pixel format, and a pointer to the memory section in physical memory that holds the uncompressed chunk. Each entry in the compressed pointer list includes a pointer to the chunk control block in physical memory. As noted above, this is only one possible implementation, and other implementations are possible, such as using a single list, with or without a caching scheme.

The Driver

As described above, the driver is responsible for memory management functions in the implementation shown above. While it is possible to implement these same memory management functions within the display controller, implementing them in the driver allows the host to choose the memory management scheme. To summarize the driver functions mentioned above, the driver manages the memory allocated to decompressed chunks through the free memory section list, and it manages the process of reclaiming memory for chunks on the re-use list. In addition, it is responsible for allocating memory for chunks when they are compressed and reclaiming memory previously allocated to decompressed chunks.

The driver is also responsible for setting up the pointer list (or lists in cases where it is implemented in two lists or in separate memory devices). These lists cover the allowable address aperture for each type of memory in which the chunks of a virtual frame buffer are stored.

The driver executing on the host CPU communicates with the virtual frame buffer controller through interrupts that notify the driver when predetermined thresholds are met, and registers that enable the driver to access pertinent data for its memory management functions. The VFB interrupts the host when it reaches a threshold in the free memory list, and when it reaches a threshold in the re-use list. The driver has access to read/write registers containing addresses to the pointer lists, to the local free memory section list, and to the re-use list. The driver also has access to a read/write register containing the local free memory section threshold, and the local free memory section count. Finally, the driver can write to a register of the VFB controller containing an increment to the free memory section list. The increment represents the number of memory sections added to the free section list. The count represents the current number of sections in the free section list.

While other implementations are possible, the increment register is the preferred way to update the free list because it can update the list atomically. As an alternative, the driver could be designed to read the current count, add the increment to it, and then write the sum to the VFB controller's count register. This can cause a problem because the VFB controller can consume another memory section from the local free section list while the driver is updating the count value. As a result, the sum that the driver writes back to the count register would be invalid. Thus, by writing an increment value to the VFB controller's register, the controller can add the value in one cycle, and it can handle the case where the count also needs to be decremented during that cycle because a memory section was consumed.

Figure 6:
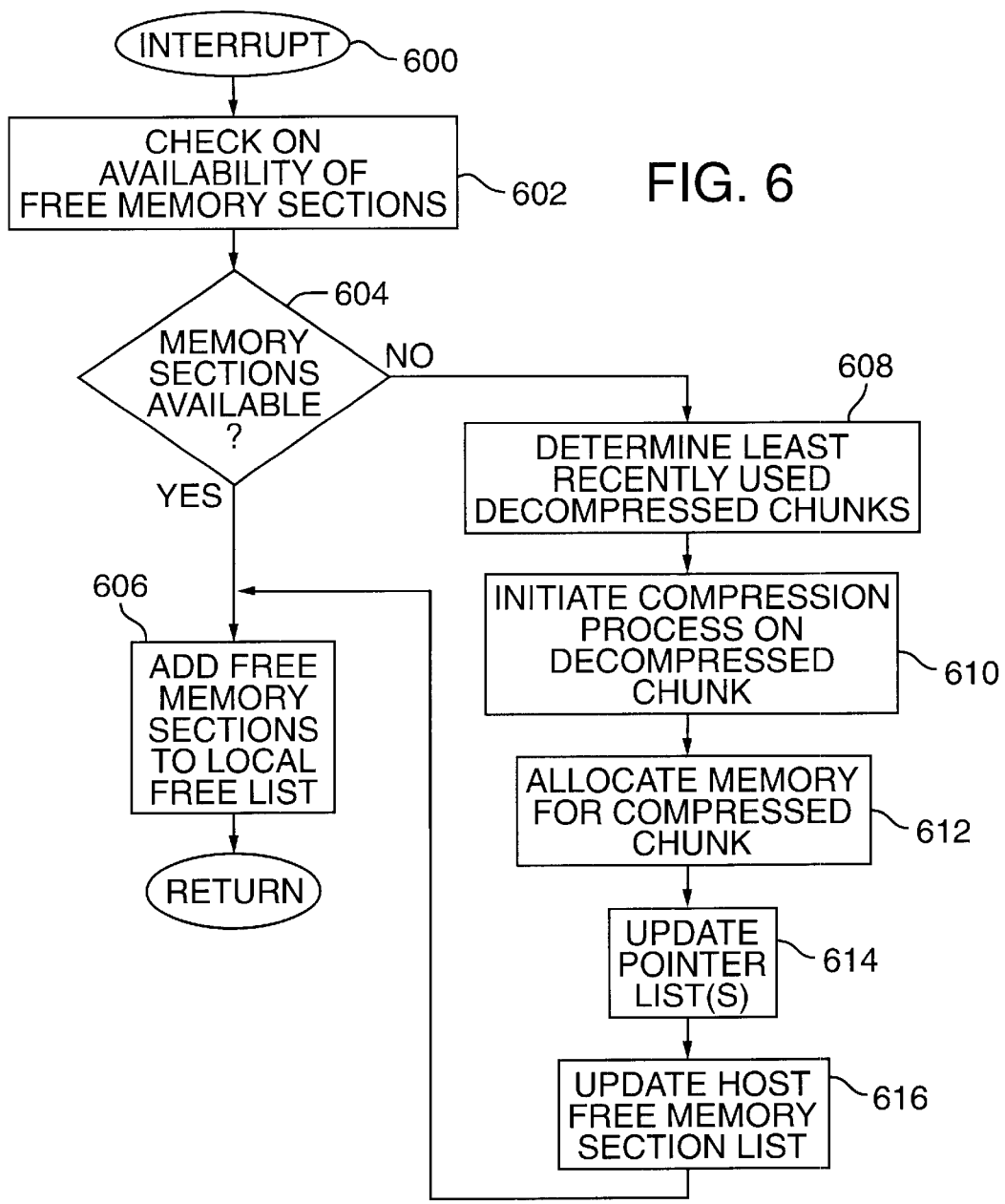
FIG. 6 is a flow diagram illustrating memory management functions of the driver software used in the implementation of FIG. 3.

FIG. 6 is a flow diagram illustrating the operation of an example driver in response to an interrupt indicating that the VFB controller needs more memory. When the driver receives this type of interrupt (600), it checks whether there are free memory sections available to add to the VFB controller's local free memory section list. This operation can be implemented in a variety of ways. In one implementation, the driver maintains a host free memory section list comprising a superset of the memory sections available to the VFB controller. At initialization, the driver creates this list for each memory device based on the amount of memory available to store compressed and uncompressed images in the device. As needed, the driver allocates memory sections from this list to its clients, including the VFB controller and any other consumer of image memory.

The driver checks on the availability of memory based on the amount of memory currently in the host free memory list. If the number of memory sections is above a given threshold, for example, the driver can add free memory sections to the VFB controller's local free memory section list (606). To accomplish this, the driver reads the pointer in the current list in the VFB controller's register, and updates the list with additional free memory sections. In addition, the driver increments the free memory section count value in the VFB controller's register.

If the number of memory sections is below the threshold, the driver can decide whether to grant or deny the request. Preferably, the threshold is set high enough so that it can grant the request, and then proceed to reclaim more memory. The path in the flow diagram branching to steps 608–616 illustrates a process for reclaiming more memory sections for least recently used decompressed blocks.

In order to reclaim memory from uncompressed chunks, the driver maintains a record of accesses to chunks in the virtual frame buffer. When called upon to reclaim memory from uncompressed blocks, the driver identifies the least recently used chunk or chunks (608) and initiates the compression process for these chunks (610). The driver does not have to involve the VFB controller to initiate the compression process. Instead, it provides the compressor 322 with the address of the memory section that holds the uncompressed pixel data to be compressed along with the address of the corresponding chunk control block and desired compression format.

The driver operates in conjunction with the compressor to manage physical memory allocated to compressed chunks (612). In the implementation illustrated in FIG. 3, the driver maintains a host free MAU list and the compressor maintains a local MAU list to allocate MAUs for compressed chunks. Both lists are linked lists of contiguous portions of physical memory. Like the VFB controller allocates memory sections from its local free memory section list, the compressor also allocates MAUs for compressed chunks from its local MAU free list, and interrupts the driver when it reaches a threshold number of MAUs in its list. In response to this interrupt, the driver increments the local MAU free list from the host MAU free list. Thus, the driver does not need to specifically intervene in the process of allocating MAUs for a compressed chunk, except to the extent that it replenishes the local MAU list. As an alternative, the driver could be adapted to allocate MAUs directly, which would involve more frequent interrupts to the driver.

Referring again to step 612 in FIG. 6, the compressor 322 uses the local free list of MAUs to allocate MAUs for the compressed chunk. The MAUs that comprise a compressed chunk are linked together in a linked list format. In the implementation, the size of an MAU is smaller than a memory section in the free memory section list because each compressed chunk may occupy a different amount of memory, depending on a potentially varying compression ratio. As such, it is not known ahead of time how many MAUs need to be linked together to store a compressed chunk. For example, a MAU is 128 bytes in the implementation as compared to a memory section of 4096 bytes. Thus, while MAUs and memory sections could be made the same size and the management of them merged into one free list, a more practical implementation is to implement them as different sizes.

When a chunk has been compressed, the driver updates the CCB for the chunk to point to the physical memory address at the start of the compressed chunk. Again, the updating of the CCB is significant since consumers of the image such as the compositor rely on the CCB to accurately reflect the state and location of the chunk. The display controller maintains the chunk in one compression state, either compressed or uncompressed. Once this state changes from uncompressed back to compressed, consumers of the chunk, such as the VFB and the compositor access the compressed version, and the driver reclaims the memory previously allocated to the uncompressed version.

After the compressor finishes compressing the chunk, the driver also updates the pointer list to reflect that the previously uncompressed chunk is now compressed (614). Specifically, it updates the flag in the pointer list to indicate that the chunk is compressed and adds the address of the CCB to the corresponding entry in the pointer list.

Finally, once the chunk is re-compressed, the memory section previously allocated to the uncompressed chunk can be returned to the host free lists maintained by the driver (616). The driver takes the address of the memory section from the pointer list entry corresponding to the chunk and adds it to the host free memory section list or the host free MAU list. In the latter case, the driver breaks the memory section allocated to the uncompressed chunk into MAUs and adds these MAUs to the free MAU list.

FIG. 6 depicts that the flow of control returns to the step (606) where the driver adds more memory to the local free memory section list in the VFB controller. However, as alluded to above, the driver does not necessarily need to follow the flow of control shown in FIG. 6 to process the interrupt. For example, the driver could be designed to grant the VFB's request for more memory when the host free memory section list drops below a threshold. Instead of denying the request for more memory, the driver could use the threshold as an indicator that it should initiate the compression process for uncompressed chunks in a separate thread or background process.

As noted above, the display controller also issues an interrupt when the number of MAUs in the local free MAU list reaches a threshold number. The driver's process of handling this interrupt parallels the process illustrated in FIG. 6. Instead of seeking to reclaim more memory by re-compressing uncompressed chunks, the driver can add more to the host free MAU list from the host free memory section list. Then, when the number of sections in the free memory section list reaches a threshold, the driver can proceed to request the display controller to re-compress more uncompressed chunks to free up additional memory.

In addition to the memory management functions described above, the driver can be implemented to manage requests from application programs and system software to allocate physical memory for images in either system or video memory. In addition, the driver can implement function calls to perform operations on images managed in the frame buffer address space (or outside this address space) to perform pixel transfer operations between source and destination images, to flip the primary display image with another image, to specify a display list of depth ordered sprites, etc. The driver can be implemented, for example, as a device driver compatible with a DirectDraw Application Programming Interface from Microsoft Corp. For more information on this type of programming interface, see co-pending U.S. patent application Ser. No. 08/641,015, entitled Method and System in Display Device Interface for Managing Surface Memory, issued as U.S. Pat. No. 5,801,717 and Ser. No. 08//641,014 entitled Display Device Interface Including Support For Generalized Flipping of Surfaces, issued as U.S. Pat. No. 5,844,560 both filed on Apr. 25, 1996, which are hereby incorporated by reference.

The driver can allocate a number of images, either visible or off-screen, in the frame buffer address space managed by the VFB controller. For images in a chunked format, the driver defines an image or sprite as an array of CCBs. The driver allocates memory for the image in terms of MAUs. The CCBs of an image each provide a linked list of the MAUs that define where the compressed block is stored in physical memory.

Examples of Address Mapping

The VFB controller emulates a two-dimensional pixel frame buffer residing in the address space of the host computer's system bus. Referred to as the virtual frame buffer, this virtual address space is depicted as the frame buffer address space in FIG. 2. The virtual frame buffer can support a variety of different display resolutions, including 640×480, 800×600, 1024×768, and 1280×1024 (each resolution represents horizontal by vertical pixels). The display controller supports each resolution with 8, 16, or 32 bits per pixel. Pixels in the 8 bpp format represent an index into a color look-up table or palette, which comprises an array of 256 red, green, and blue (RGB) color triplets. Pixels in the 16 bpp format include 4 bits each of red, green, and blue, and also include a single alpha bit. Finally, pixels in the 32 bpp format include 8 bits each of red, green, and blue, and can also include an additional 8 bits of alpha. In addition to these formats, the invention applies to other color spaces and pixel formats as well.

The upper left corner of the virtual frame buffer (address 0) always starts at the lowest address of the frame buffer. Each subsequent row of the framebuffer starts at a fixed offset from the previous row. This offset may be equal to (width*BPP)(width of the frame buffer in bytes times the number of bytes per pixel), or it may be set to a fixed number which is larger than (width*BPP). This offset is called the stride of the frame buffer. As an example, the current implementation of the VFB controller uses a fixed stride of 8192 to simplify the calculation of which chunk contains a requested pixel address.

Figure 7:
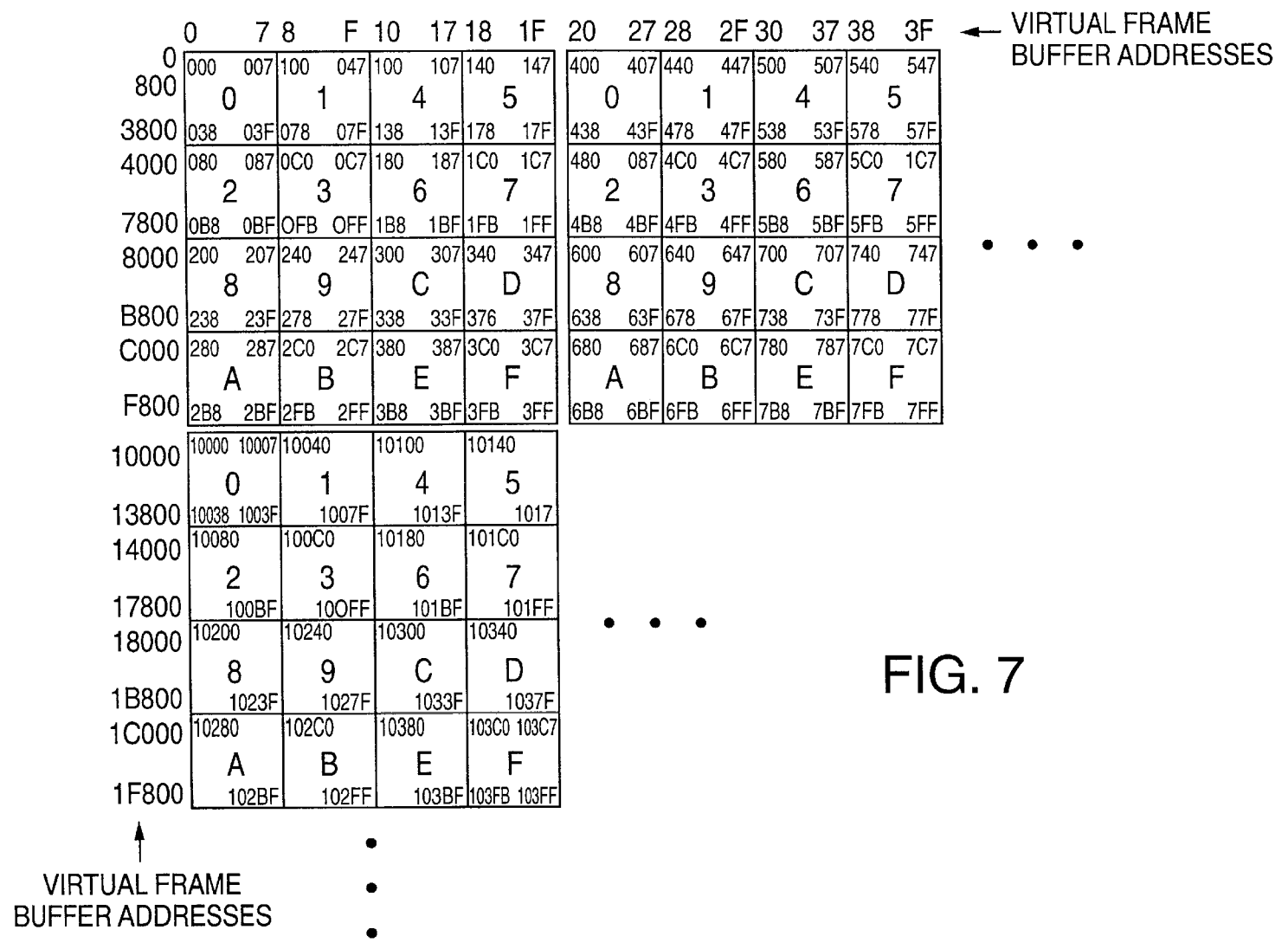

FIG. 7 is a diagram illustrating the virtual frame buffer of FIG. 2 in terms of the chunks in the virtual frame buffer and the individual 8×8 pixel blocks in each chunk. Each of the 32×32 pixel chunks in the display image are composed of 16 8×8 pixel blocks according to the pattern shown in FIG. 7. While this diagram illustrates a specific implementation of the chunks in a display image, the specific implementation of the chunk configuration can vary. For example, a chunk can be comprised of a single scan line, a series of scan lines, or a rectangular block of varying dimensions.

The display controller of FIG. 3 emulates a virtual frame buffer by re-directing read and write requests to the linear address space of the virtual frame buffer to a physical address.

FIG. 7 illustrates how the display controller maps a linear address to the virtual frame buffer to the physical address in shared memory. In this implementation for the PCI bus, the VFB logic extracts the address of a pixel in the virtual buffer from the PCI address format. Specifically in this case, the VFB logic extracts the address of a pixel in a chunk. As illustrated in FIG. 7, a chunk is comprised of blocks arranged in a pre-defined order, and each block is comprised of 64 pixels, also arranged in a predefined order.

The VFB logic converts the linear address of a location in the virtual frame buffer to an address of a pixel in a decompressed chunk stored in physical memory. Specifically, the VFB logic rearranges the bits in the linear address to match the storage order of pixels into blocks and blocks into chunks according to the chunk format. The software that reads and writes pixels to the virtual frame buffer, therefore, does not need to know the chunk format, but rather can use a conventional linear address as if the pixels in the display image reside in a conventional frame buffer.

As noted above, the VFB controller can manage more than just the display image in the frame buffer address space of the VFB. For example, assuming the frame buffer address space is 8 KB by 8 KB, and the display image does not occupy this entire space, additional off-screen images or sprite layers can be allocated within the frame buffer address space managed by the VFB controller. The address mapping that applies to the display image applies in the same fashion to other chunked images in the frame buffer address space. The operation of the VFB controller described above is actually not dependent on which image a chunk actually falls into because it maintains a list of chunks that it manages without regard to whether those chunks fall in separate images. However, it is worth noting that the VFB controller does update the CCB state so that other clients that operate on images implemented as an array of CCBs have the most current state of the image.

Figure 8:
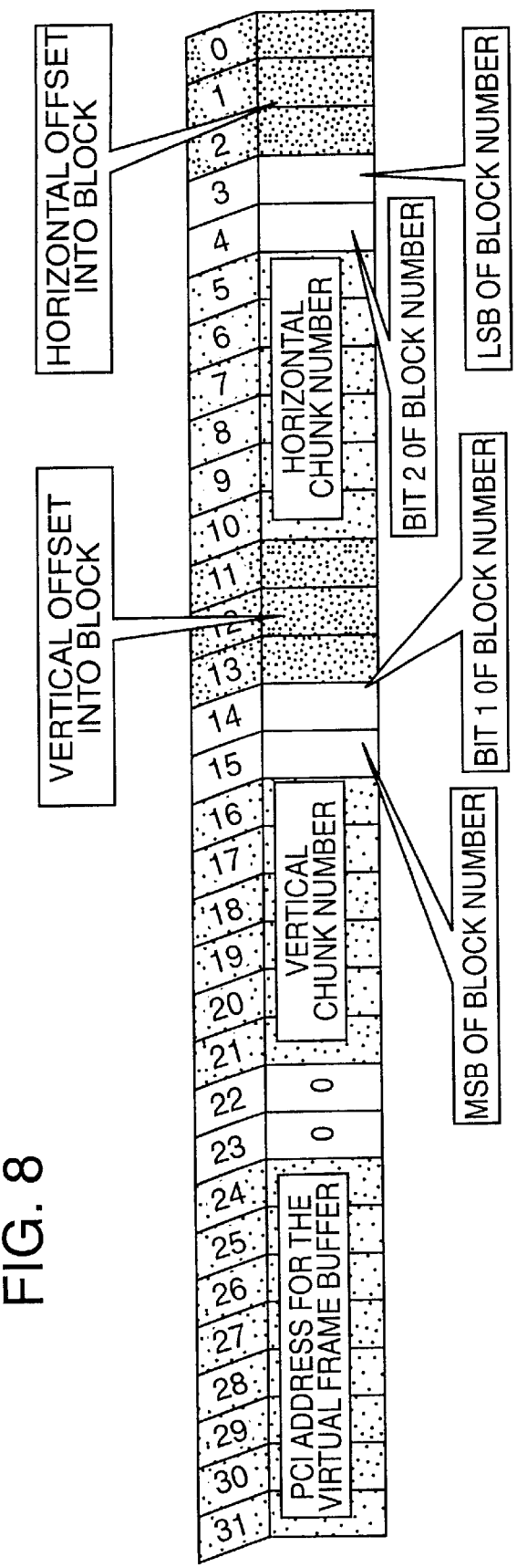
FIG. 8 is a diagram illustrating an example of a linear address format that the virtual frame buffer controller of FIG. 3 maps to a physical address within an uncompressed chunk in physical memory.

FIG. 8 illustrates the PCI address format for pixels in 8 bpp format. The addresses for 16 and 32 bpp formats are quite similar, except that the VFB logic shifts bits 21:0 left by one bit for pixels in 16 bpp format and by two bits for pixels in 32 bpp format (8 bits each of RGB and alpha).

The vertical chunk number shown at bits 21:16 in FIG. 8 represents the row number of a row of chunks in the virtual frame buffer.

The PCI address format of FIG. 8 also encodes a four bit block number that identifies the block within a chunk. This block number is encoded at bits 15:14 and 4:3 in the example shown in FIG. 8. The vertical and horizontal offsets shown in FIG. 8 identify a pixel location or address within a block.

Compression and Decompression Processes

The system architecture and methods that support the virtual frame buffer described above can use a variety of compression and decompression methods. A specific implementation of the compressor and decompressors are described below. It is important to note that the invention is not limited to this implementation.

The compressor and decompressor in the display controller of FIG. 3 support both lossy and lossless compression. The compressor performs lossy compression in the following four or five steps (depending on whether a color space conversion is included):

1. Convert the RGB data input to a YUV-like luminance-chrominance system (optional).
2. Perform a forward, two-dimensional discrete cosine transform (DCT) individually on each color component.
3. Order the two-dimensional DCT coefficients in approximately a monotonically increasing frequency order.
4. Quantize the DCT coefficients: Divide by either a uniform divisor or a frequency-dependent divisor.
5. Encode the resulting coefficients using Huffman encoding with fixed code tables.

Lossy decompression occurs in four or five steps:

1. Decode the compressed data input using Huffman decoding with fixed code tables.
2. Dequantize the compressed data: Multiply by the uniform multiplier or the frequency-dependent multiplier used in the quantization step of compression.
3. Reorder the linear array of data into the proper two-dimensional order for DCT coefficients.
4. Perform an inverse, two-dimensional DCT individually on each color component.
5. Convert the colors in the YUV-like luminance-chrominance system to RGB colors, if the compression process included the corresponding optional step.

Each of these steps are described below.

Color Space Conversion

The color space conversion transforms the RGB colors to a brightness-color system with brightness coordinate Y and color coordinates U and V. This luminance-chrominance system is not a standard color space. Using this system improves the degree of compression because the color coordinates require only a small fraction of the bits needed to compress the brightness. The lossless, reversible conversion applies to each pixel independently and does not change the value of alpha.

RGB to YUV (for compression)

The conversion from integer RGB values to integer YUV values uses this transformation:

$Y=(4R+4G+4B)/3-512$ $U=R-G$ $V=(4B-2R-2G)/3$

YUV to RGB (for decompression)

The conversion from integer YUV values to integer RGB values uses this transformation:

$R=(((Y+512)-V)/2+U+1)/2$ $G=(((Y+512)-V)/2-U+1)/2$ $B=((Y+512)/2+V+1)/2$

Discrete Cosine Transform

Images and textures are pixels that contain the amplitudes for three colors and the amplitude for opacity. The pixel positions correspond to a spatial location in an image or texture map. An image or texture in this form is in the spatial domain. For images or textures, the discrete cosine transform (DCT) calculates coefficients that multiply the basis functions of the DCT. Applying the DCT to an image or texture yields a set of coefficients that equivalently represent the image or texture. An image or texture in this form is in the frequency domain.

The DCT maps the amplitude of the colors and opacity of an 8 by 8 pixel block between the spatial domain and the frequency domain. In the frequency domain, adjacent coefficients are less correlated, and the compression process can treat each coefficient independently without reducing the compression efficiency.

The forward DCT maps the spatial domain to the frequency domain, and conversely, the inverse DCT maps the frequency domain to the spatial domain. One suitable approach for the forward and inverse DCT is the approach described in FIGS. 1.1 and A. 1.2 in *Discrete Cosine Transform*. Rao, K. R., and P. Yip. San Diego: Academic Press, Inc., 1990.

The two-dimensional DCT produces a two-dimensional array of coefficients for the frequency domain representation of each color component. Zigzag ordering rearranges the coefficients so that low DCT_frequencies tend to occur at low positions of a liner array. In this order, the probability of a coefficient being zero is approximately a monotonically increasing function of the position in the linear array (as given by the liner index). This ordering simplifies perceptual quantization and LOD filtering and also significantly improves the performance of the run-length encoding (RLE).

Quantization

Quantization reduces the number of different values that the zigzag-ordered DCT coefficients can have by dividing the coefficients by an integer. Depending on the value of the compression type parameter, quantization can be either uniform or perceptual. Neither case modifies the DC frequency coefficient (index=0), but instead passes it along unaltered.

The quantization process begins with the specification of the quantization factor (QF actor) for an image or portion of an image. In this implementation, a Qfactor is specified for a 32×32 pixel chunk. A quantization index (QIndex) specifies a corresponding quantization factor (QFactor) to use for the chunk. The following table shows the relationship between QIndex and Qfactor.

| | Quantization Factor | | |
|---|---|---|---|
| Quindex | Qfactor | Qindex | Qfactor |
| 0 | 2 | 8 | 32 |
| 1 | 3 | 9 | 48 |
| 2 | 4 | 10 | 64 |
| 3 | 6 | 11 | 96 |
| 4 | 8 | 12 | 128 |
| 5 | 12 | 13 | 192 |
| 6 | 16 | 14 | 256 |
| 7 | 24 | 15 | 4096 |

Each color plane has a different value for the chunk Qindex. A QIndex of 15 selects a QFactor of 4096, which produces zeros during quantization and inverse quantization. The quantization process divides each coefficient in a block by a QFactor and rounds it back to an integer. The inverse quantization process multiplies each coefficient by a QFactor. Quantization and inverse quantization do not change the DC frequency component.

Block Quantization Factor

The QIndex, and thus the QFactor, can vary from block to block (8×8 pixels). The QIndex for a block results from incrementing the QIndex for the chunk with a value embedded in the block compression type:

Block QIndex=Chunk QIndex+(Block Compression Type−3)

This increments the chunk QIndex by one, two, three, or four. Because the largest possible QIndex value is 15, any incremented value greater than 15 is set to 15.

The QIndex, and thus the QFactor, can also vary from coefficient to coefficient (from array index to array index) if the quantization type is perceptual.

For uniform quantization, the coefficient QIndex is equal to the block QIndex, so the corresponding QFactor either multiplies (inverse quantization) or divides (quantization) each coefficient in the block.

For perceptual quantization, the coefficient QIndex depends on the value (0 63) of the index in the linear array. The following table gives the resulting coefficient QIndex as a function of the array index value.

| Coefficient QIndex | Array Index |
|---|---|
| Block QIndex | index < 12 |
| Block QIndex + 1 | 12 index < 28 |
| Block QIndex + 2 | 28 index < 52 |
| Biock QIndex + 3 | 52 index |

Entropy Coding

Huffman/RLE coding processes the linear array of quantized DCT coefficients by:

1. Independently encoding non-zero coefficients with the fewest possible bits (because the DCT coefficients are uncorrelated).
2. Optimally encoding continuous "runs" of coefficients with zero values—especially at the end of the linear array (because of the zigzag_ordering).

One suitable approach for the Huffman/RLE coding process is the Huffman/RLE coding process used for the AC coefficients in the well known JPEG still image compression standard.

To enable random access of blocks, this particular approach does not encode the DC frequency coefficient (index=0), but instead passes it on unaltered. The algorithm computes a series of variable-length code words, each of which describes:

1. The length, from zero to 15, of a run of zeros that precedes the next non-zero coefficient.
2. The number of additional bits required to specify the sign and mantissa of the next non-zero coefficient.

The sign and mantissa of the non-zero coefficient follows the code word. One reserved code word signifies that the remaining coefficients in a block are all zeros.

Encoding

The encoding of all blocks uses the typical Huffman tables for AC coefficients from Annex K, section K.3.2 of ISO International Standard 10918. This includes Table K.5 for the luminance (Y) AC coefficients and Table K.6 for the chrominance (U and V) AC coefficients.

Decoding

The decoding of all blocks uses the same fixed tables as the encoding process. Therefore, it is never necessary to store or to convey the Huffman tables with the data.

Lossless Compression\Decompression

In one implementation of the compressor illustrated in FIG. 3, lossless compression occurs in two or three steps:

1. Convert incoming RGB data to a YUV-like luminance-chrominance system (optional).
2. Perform a differential prediction calculation on each color component.
3. Encode the resulting coefficients using Huffman encoding with fixed code tables.

Lossless decompression in one implementation of the decompressors of FIG. 3 occurs in two or three steps:

1. Decode the incoming compressed data using Huffman decoding with fixed code tables.
2. Perform an inverse, differential prediction (reconstruction) on each color component.
3. Convert the colors in the YUV-like luminance-chrominance system to RGB colors if the compression process included this corresponding optional step.

Color Space Conversion

The color space conversion reversibly transforms the RGB colors to a brightness-color system with brightness coordinate Y and color coordinates U and V. This is a unique color space that improves the degree of compression even more than the YUV system above because the numbers entering the Huffman/RLE encoder are smaller, and hence more compressible. The color space conversion applies to each pixel independently and does not change the value of alpha.

RGB to YUV (for compression)

The conversion from integer RGB values to integer YUV values uses this transformation:

Y=G

U=R−G

V=B−G

YUV to RUB (for decompression)

The conversion from integer YUV values to integer RGB values uses this transformation:

R=Y+U

G=Y

B=Y+V

Alpha information is not altered during the color space transform.

The color space transform can be bypassed. The decompressor is notified in cases where the color transform is bypassed by a flag in a control data structure used to store control parameters for the display image.

The prediction stage occurs after the color space transform. Prediction is a losslessly invertible step that reduces the entropy of most source images, particularly images with lots of blank space and horizontal and vertical lines.

In the prediction stage of compression and the inverse prediction stage of decompression:

1. p(x, y) are the pixel values input to the compressor and output from the decompressor; and
2. d(x, y) are the difference values input to the coder in the next stage of the compression engine and output from the inverse of the coder in the decompressor.

Prediction is computed as follows:

d(x, y)=p(x, y) for x=0, y=0 d(x, y)=p(x, y)−p(x, y−1) for x=0, y>0 d(x, y)=p(x, y)−p(x−1,y) for x>0

Inverse prediction in the decompressor is computed as follows:

p(x, y)=d(x, y) for x=0, y=0 p(x, y)=p(x, y−1)+d(x, y) for x=0, y>0 p(x, y)=p(x−1,y)+d(x, y) for x>0

The Huffman/RLE coding and decoding is the same as for the lossy form of decompression/decompression in this implementation.

The compression methods described above compress images in independent blocks of 8×8 pixels. Therefore, each compressed 32×32 pixel chunk consists of 16 such blocks.

The VFB controller has access to the CCB array structure used to keep track of each compressed chunk in an image. As noted above, this structure keeps a list of the chunks that comprise the image. To display the compressed image, the driver passes a display list including the CCB arrays of the images to be displayed to the compositor, which uses the structure to fetch the compressed chunks from physical memory, decompress the chunks, and construct a decompressed display image. Instead of using a complete frame buffer, the compositor uses a compositing buffer that holds a horizontal row of chunks. The DAC scans pixels from this buffer and converts them to a form compatible with the display monitor.

This list of chunks comprises a list of pointers to chunk control blocks. These chunk control blocks include per chunk and per block parameters. The per chunk parameters include a YUV color converter bypass, default Q factors, a perceptual quantization flag, pixel format, and whether the pixel data resides in memory managed in MAUs in linear memory. An MAU is a contiguous piece of physical memory used to allocate physical memory for compressed chunks. MAU managed memory includes a list of MAUs (128 bytes for example), each MAU having a pointer to the next MAU.

The per block parameters in this implementation include compression type, number of MAUs the block spans, and a block pointer pointing to the first byte of pixel data for the block.

Conclusion

While the invention is described in the context of specific implementation details, it is not limited to these specific details. The VFB controller and related display architecture components described above implement a method for efficiently managing images in compressed and uncompressed form. In the specific implementation described above, a VFB controller operates in conjunction with driver software executing on the host. Depending on the implementation, the VFB management functions can be assigned to the host processor and to the display controller in different ways. For instance, some display controllers have a separate processor that could be used to perform some of the memory management functions described above. In contrast, some display controllers may rely even more heavily on the host processor to perform memory management functions, such as allocating portions of physical memory for compressed and uncompressed blocks directly. The specific data structures used to manage images in a VFB, the chunks of the image, the free lists, the re-use list and the structures for maintaining state and location of VFB managed chunks can vary as well. As noted above, the pointer list can be implemented as separate lists, or a single list. The free lists are implemented differently for different sizes of memory sections. However, it is possible to use a universal memory size for memory allocation and reclaiming functions.

In view of the many possible implementations of the invention, it should be recognized that the implementation described above is only an example of the invention and should not be taken as a limitation on the scope of the invention. Rather, the scope of the invention is defined by the following claims. I therefore claim as my invention all that comes within the scope and spirit of these claims.

I claim:

1. A method for managing a virtual frame buffer comprising blocks comprising compressed pixels and blocks comprising uncompressed pixels stored at arbitrary locations in physical memory, the method comprising:

receiving a request to access a pixel in the virtual frame buffer, wherein the request specifies an address of the pixel;

mapping the address of the request to a location in a block of pixels stored at an arbitrary location in physical memory, wherein the block of pixels is capable of being in one of the following two formats, a compressed format and an uncompressed format;

determining whether the block of pixels stored at an arbitrary location in physical memory is of the compressed or uncompressed format;

when the block is of the compressed format, initiating a decompression process on the block of compressed format, allocating memory at an arbitrary location to store the block of compressed format in uncompressed format, and reclaiming memory from the block of compressed format;

when the block is of the uncompressed format, allowing the access request to be completed to the pixel; and when compressing a block of decompressed format, initiating a compression process on the block of decompressed format, allocating memory at an arbitrary location to store the block of decompressed format in compressed format, and reclaiming memory from the block of decompressed format;

wherein memory reclaimed from a block of decompressed format of the virtual frame buffer is allocable for a block of compressed format of the virtual frame buffer, and memory reclaimed from a block of compressed format of the virtual frame buffer is allocable for a block of decompressed format of the virtual frame buffer.

2. The method of claim 1 wherein determining whether the block of pixels is stored in the compressed or uncompressed format includes:

maintaining a list of pointers where entries in the list indicate a physical memory location and explicitly indicate the compression format of a corresponding block.

3. The method of claim 2 further including:

when a block is determined to be compressed in response to an access request, updating the list to indicate that the block is in the uncompressed format after the decompression process is complete and to indicate a new memory location of the uncompressed block.

4. The method of claim 2 wherein the list includes two lists: a first list of compressed blocks and a second list of uncompressed blocks.

5. The method of claim 2 wherein at least a portion of the pointer list is stored in the memory where the compressed and uncompressed blocks are stored and at least a portion is cached locally by a client device of the list such that latency experienced by the client while accessing the list from the memory is reduced.

6. The method of claim 1 further including:

maintaining a list of free memory;

wherein the step of allocating memory for the decompressed block includes allocating memory from the free list.

7. The method of claim 6 further including:

when the free list has lower than a threshold amount of available memory, initiating a compression process to compress one or more decompressed blocks.

8. The method of claim 1 wherein reclaiming memory from the block of compressed format includes:

adding a data structure defining location of the compressed block in physical memory to a re-use list.

9. A method for managing access to a virtual frame buffer comprising memory organized in arbitrarily placed blocks of compressed and uncompressed pixels, the method comprising:

receiving requests for access to pixels in the virtual frame buffer according to a linear addressing scheme;

transforming the requests into references to arbitrarily placed blocks of compressed and decompressed pixels in the virtual frame buffer;

maintaining a free memory section list listing memory sections available to be allocated to uncompressed blocks of pixels when a compressed block in the virtual frame buffer is decompressed;

in response to receiving notification that additional memory sections need to be made available for allocation to uncompressed blocks of pixels for the virtual frame buffer, identifying free memory sections that are available for allocation for the virtual frame buffer and adding the free memory sections to the list;

when identifying free memory sections indicates that the number of free memory sections available for allocation has dropped below a predetermined amount, identifying least recently used uncompressed blocks for the virtual frame buffer, initiating a compression process on the least recently used uncompressed blocks, and freeing memory allocated to the uncompressed blocks for re-use to store other uncompressed blocks for the virtual frame buffer.

10. The method of claim 9 further including:

after the compression process has re-compressed a block of uncompressed pixels, adding a memory section previously allocated to the uncompressed block to a free memory section list.

11. The method of claim 9 further including:

maintaining a list of compressed and uncompressed blocks of pixels comprising a display image, where the display image represents the entire image visible on a display device and each of the blocks of the display image is in either a compressed state or an uncompressed state, but not both; and updating the list when an uncompressed block is recompressed to reflect that the recompressed block is no longer in an uncompressed state.

12. The method of claim 11 wherein the list comprises a first list of pointers to uncompressed blocks and a second list of pointers to compressed blocks.

13. The method of claim 12 further including:

issuing linear addresses to a display controller for converting the linear addresses to addresses within uncompressed and uncompressed pixel blocks.

14. The method of claim 9 further including:

reclaiming physical memory previously allocated to compressed blocks that have been decompressed, including reading a re-use list of compressed blocks that have been decompressed, and adding physical memory space previously used to store the compressed blocks on the re-use list to a free memory list.

15. A computer readable medium having computer executable instructions for performing the method of claim 9.

16. A system for managing a display image comprising:

a host CPU executing software for issuing pixel access requests to an image in a linear frame buffer address space;

a virtual frame buffer controller for mapping the access requests to a pixel within a randomly accessible block of pixels stored in physical memory, for maintaining a data structure indicating a physical memory location and explicitly indicating a compression state of each block in the display image, for initiating a decompression process when one of the pixel access requests corresponds to a pixel in a compressed block, for reclaiming memory from the compressed block when the compressed block is decompressed, for initiating a compression process on a decompressed block, allocating memory at an arbitrary location to store the decompressed block as compressed, and for reclaiming memory from the decompressed block when the decompressed block is compressed; and a virtual frame buffer for storing the blocks of the image in either a compressed or uncompressed format;

wherein compressed and decompressed blocks are stored at arbitrary locations in memory of the system, memory reclaimed from compressing a decompressed block of the virtual frame buffer is allocable for a compressed block of the virtual frame buffer, and memory reclaimed from decompressing a compressed block of the virtual frame buffer is allocable for a decompressed block of the virtual frame buffer.

17. A method for managing an image constructed from blocks of compressed and uncompressed pixels and stored in arbitrary locations in physical memory, the method comprising:

receiving a request to access a pixel in the image, the request including a linear address of the pixel in a virtual frame buffer;

mapping the linear address of the request to a location in a randomly accessible block of pixels, which is capable of being in one of the following two formats, a compressed format and an uncompressed format;

maintaining a block list having an entry for each of the blocks in the image, where each entry in the list corresponds to a block and indicates the physical memory location and compression state of the corresponding block;

determining whether the block of pixels containing the pixel is stored in the compressed or uncompressed format by checking the corresponding entry in the list;

when the block containing the pixel is in the compressed format, initiating a decompression process on the block, allocating memory to store the block in uncompressed format, adding the compressed block to a re-use list, updating the block list to indicate that the block containing the pixel has been decompressed, and allowing the request to access the pixel to be completed; and when the block containing the pixel is in the uncompressed format, computing the address of the pixel from the linear address and the address of the uncompressed block in the block list, and allowing the access request to be completed to the pixel.

18. A method for providing a service fulfilling per-pixel access requests to an image stored in blocks comprising blocks of compressed pixels and blocks of uncompressed pixels, the method comprising:

receiving a request to perform an action with respect to a pixel of the image, wherein the pixel resides in a block;

determining which entry in a data structure is associated with the block in which the pixel resides; and for a compressed block, performing the following:

consulting at least the entry in the data structure to determine the location of the block and whether the block is compressed or decompressed;

responsive to determining the block in which the pixel resides is compressed, allocating memory from a memory pool, decompressing the block to the allocated memory, indicating in the entry that the block is decompressed, reclaiming memory to the memory pool freed by decompressing the block, and performing the action with respect to the pixel of the image in the decompressed block; and reclaiming memory to the memory pool by subsequently compressing the decompressed block;

for a decompressed block, performing the following:

consulting at least the entry in the data structure to determine the location of the block and whether the block is compressed or decompressed; and responsive to determining the block in which the pixel resides is decompressed, performing the action with respect to the pixel of the image in the decompressed block.

19. The method of claim 18 wherein reclaiming memory to the memory pool by subsequently compressing the decompressed block is delayed until after a plurality of accesses have been performed for a pixel in the decompressed block.

20. A method for fulfilling access requests to an image comprising blocks comprising compressed pixels and blocks comprising uncompressed pixels stored at arbitrary locations in physical memory, wherein the access requests comprise write operations, the method comprising:

receiving a request to access a pixel in the image, wherein the request specifies an address of the pixel;

mapping the address of the request to a location in a block of pixels stored at an arbitrary location in physical memory, wherein the block of pixels is capable of being in one of the following two formats, a compressed format and an uncompressed format;

consulting an entry in a data structure to determine whether the block of pixels stored at an arbitrary location in physical memory is of the compressed or uncompressed format;

when the block is of the compressed format, initiating a decompression process on the block of compressed format, allocating memory to store the block of compressed format in uncompressed format, reclaiming memory from the block of compressed format, updating the data structure, and fulfilling the access request;

when the block is of the uncompressed format, fulfilling the access request; and to free memory for subsequent requests, compressing a block of decompressed format and updating the data structure, wherein compressing a block of decompressed format comprises initiating a compression process on the block of decompressed format, allocating memory to store the block of decompressed format in compressed format, and reclaiming memory from the block of decompressed format;

wherein memory reclaimed from a block of decompressed format of the virtual frame buffer is allocable for a block of compressed format of the virtual frame buffer, and memory reclaimed from a block of compressed format of the virtual frame buffer is allocable for a block of decompressed format of the virtual frame buffer.

21. The method of claim 20 wherein the data structure comprises a list of entries explicitly indicating whether a block is compressed or decompressed.

* * * * *

UNITED STATES PATENT AND TRADEMARK OFFICE
CERTIFICATE OF CORRECTION

PATENT NO. : 6,366,289 B1
DATED : April 2, 2002
INVENTOR(S) : Johns

It is certified that error appears in the above-identified patent and that said Letters Patent is hereby corrected as shown below:

Column 2,
Line 47, "5,880,787" should read -- 5,880,737 --.

Column 16,
Line 4, "5,844,560" should read -- 5,844,569 --.

Column 18,
Line 62, "1.1" should read -- A.1.1 --.

Column 19,
Lines 2 and 5, "liner" should read -- linear --.
Line 18, "(QF actor)" should read -- (Q Factor) --.

Column 20,
Line 18, "zigzag_ordering" should read -- zigzag ordering --.

Column 23,
Line 45, "wherein the step of allocating" should read -- wherein allocating --.

Signed and Sealed this

Twenty-sixth Day of August, 2003

JAMES E. ROGAN
*Director of the United States Patent and Trademark Office*